United States Patent [19]

Daitoku

[11] 4,379,629

[45] Apr. 12, 1983

[54] APPARATUS FOR CONTROLLING FILM ADVANCEMENT IN A CAMERA

[75] Inventor: Koichi Daitoku, Tokyo, Japan

[73] Assignee: Nippon Kogaku K.K., Japan

[21] Appl. No.: 263,173

[22] Filed: May 13, 1981

[30] Foreign Application Priority Data

May 21, 1980 [JP] Japan .................................. 55-66381

[51] Int. Cl.³ .............................................. G03B 1/18
[52] U.S. Cl. .................................... 354/173; 354/214
[58] Field of Search ............... 354/173, 212, 213, 214, 354/215

[56] References Cited

U.S. PATENT DOCUMENTS

| | | | |
|---|---|---|---|
| 4,012,755 | 3/1977 | Arai | 354/214 |
| 4,171,892 | 10/1979 | Kozuki et al. | 354/214 |
| 4,299,466 | 11/1981 | Harvey | 354/214 |
| 4,304,480 | 12/1981 | Fukahori et al. | 354/214 |
| 4,306,794 | 12/1981 | Fukahori et al. | 354/214 |

*Primary Examiner*—Russell E. Adams
*Attorney, Agent, or Firm*—Shapiro and Shapiro

[57] ABSTRACT

An apparatus for controlling an electrically driven film transport mechanism includes a displacement member that controls a change-over switch for selecting either a film take-up mode or a film rewind mode, and first and second members for controlling the position of the displacement member. The first member, which is responsive to film tension, automatically causes the displacement member to select the film take-up mode at the end of film rewind, thereby halting the film transport mechanism. The second member has a first position at which it holds the displacement member in a film take-up selecting mode for film take-up, and has a second position which enables movement of the displacement member to a film rewind selecting mode. Upon initial film advancement to load a fresh roll of film into the camera, the second member is automatically returned to its first position.

8 Claims, 10 Drawing Figures

APPARATUS FOR CONTROLLING FILM ADVANCEMENT IN A CAMERA

BACKGROUND OF THE INVENTION

1. Field of the Invention

This invention relates to an electric driving device for a photographic camera which performs take-up and rewind of the film by means of an electric motor.

2. Description of Prior Arts

There has so far been used an electric driving device for a photographic camera constructed with a rewinding means which enables the photographic film to be rewound by disconnecting a film take-up mechanism from the driving system; a sensing means to detect the film wound on a take-up spool; and a mode selecting means capable of selecting either of an electric take-up mode and an electric rewinding mode, wherein the rewinding means is associated with the sensing means to perform the mode selecting operation by the mode selecting means. Such a conventional device operates to rewind the film by selecting the electric rewinding mode, and, upon completion of the film rewinding, the sensing means is no longer in its detecting state and the film rewinding operation stops automatically. However, when unexposed film is newly loaded and electrically wound on the take-up spool after the exposed film has been rewound, the take-up operation is not possible unless the rewinding means is restored to its state prior to its rewinding operation. Further, mere depression of the shutter button, forgetting restoration of the film rewinding means, serves in no way to enable electric film take-up operation, which might be apprehensively mistaken for a malfunction.

SUMMARY OF THE INVENTION

It is therefore a primary object of the present invention to provide an electric driving device for a photographic camera which eliminates the abovementioned various disadvantages, and is capable of taking up film on a take-up spool after completion of an electric rewinding operation of exposed film without the necessity for restoring the rewinding means to its state prior to its rewinding operation.

DETAILED DESCRIPTION OF PREFERRED EMBODIMENT

In the following, the present invention will be described in detail in reference to the preferred embodiment shown in the accompanying drawing.

Figure 1:
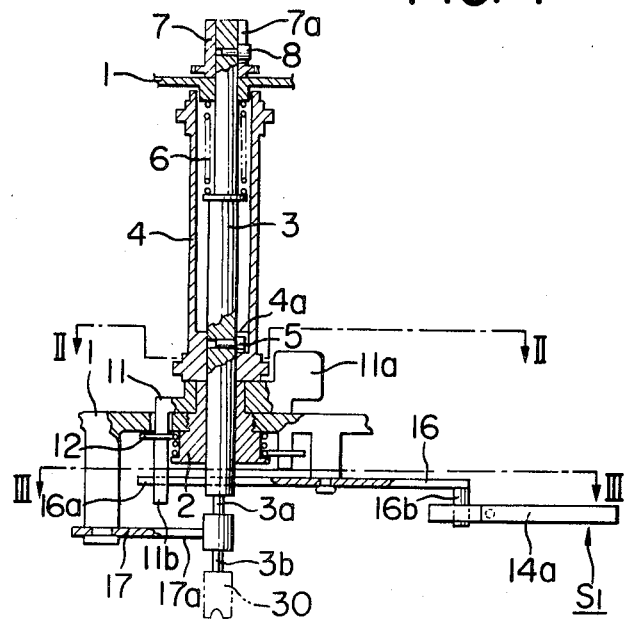
FIG. 1 is a partial longitudinal cross-sectional view of one preferred embodiment of an electric driving device for a photographic camera according to the present invention.

Referring to FIG. 1, a sprocket shaft 3 is inserted in and through the bottom part of a camera body 1 and supported by a bearing 2 in such a manner as to be movable up and down. A cylindrical sprocket 4 having on its outer periphery a plurality of sprocket teeth for meshing with film perforations fittingly surrounds the outer periphery of the sprocket shaft 3. A pin 5 diametrically passing through the sprocket shaft 3 is received in a notched groove 4a formed in the sprocket 4 in an engageable and disengageable manner. The sprocket shaft 3 is also downwardly biased by a compression spring 6 disposed between a top cover of the camera body 1 and a flanged part of the sprocket shaft 3. A drive gear 7 is fitted on top of the sprocket shaft 3. Within a notched groove 7a formed in the drive gear 7, there is engaged a pin 8 also inserted diametrically in the sprocket shaft 3.

Figure 2:
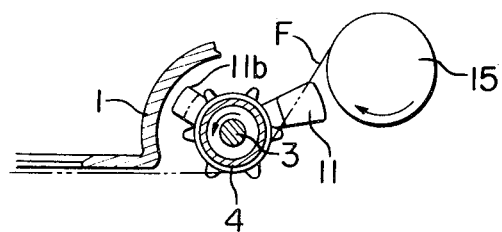
FIG. 2 is a cross-sectional view of the driving device taken along a line II—II in FIG. 1.

As shown in FIGS. 1 and 2, a film detection lever 11 rotatably fitted around the bearing 2 has a film detecting part 11a and an engaging part 11b extending in substantially the opposite direction, and is biased clockwise (in FIG. 2) by a torsion spring 12 extending betwen the camera body 1 and the bearing 2.

Figure 3:
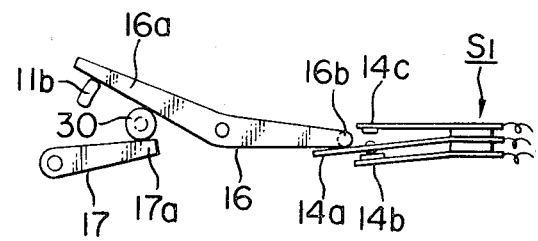
FIG. 3 is a cross-sectional view of the driving device taken along a line III—III in FIG. 1.

Furthermore, a switch change-over lever 16 and a sprocket shaft holding lever 17 are rotatably mounted on the camera body 1 as shown in FIGS. 1 and 3. The lever 16 has one end 16a which is engageable with the engaging part 11b of the film detection lever 11, while the lever 17 is biased counterclockwise in FIG. 3 as by a spring (not shown). At a lower portion of the sprocket shaft 3, there are formed an outer groove 3a and an outer groove 3b, into which the ends 16a of the lever 16 and 17a of the lever 17 can be respectively received when the shaft 3 moves upward.

A change-over switch $S_1$ for selecting the film take-up mode and the film rewinding mode has a contact 14a and contact terminals 14b, 14c. The contact 14a usually contacts the contact terminal 14c to select the rewinding mode. Selection of the take-up mode is done by a pin 16b connected to the opposite end (from 16a) of the change-over lever 16 which causes the contact 14a to be in contact with the terminal 14b. A film take-up spool 15 is disposed by the side of the film detection lever 11.

Figure 4:
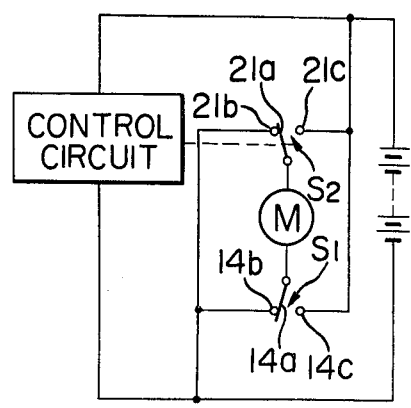
FIG. 4 is a schematic diagram of a mode selecting circuit to be used in combination with the embodiment shown in FIG. 1.

The drive gear 7 and the take-up spool 15 are connected to a drive motor M of the mode selection circuit shown in FIG. 4 through a film take-up system (not shown). This mode selection circuit is constructed with a control circuit A, a power source E, the abovementioned mode selection switch $S_1$, and a switch $S_2$ consisting of a contact 21a associated with the control circuit A and a pair of terminals 21b, 21c disposed at each side of the contact 21a. The control circuit A performs its control operation for automatic change-over of the switch $S_2$ upon its receipt of an exposure completion signal which is produced when the film exposure has been completed, and a take-up completion signal which is produced when the shutter charging and the film take-up operations have been completed. When the shutter button is depressed (the state shown in FIG. 4 being prior to depression), a shutter mechanism (not shown) opens a film exposing aperture and produces an exposure completion signal after closure of the shutter, and the control circuit A causes the contact 21a of the switch $S_2$ in contact the terminal 21c, whereby the motor M becomes conductive and rotates forwardly for film take-up. As soon as the shutter charging and the film take-up have been completed, the take-up completion signal is imparted to the control circuit A by a detecting member (not shown), whereby the control circuit A changes the contact 21a of the switch $S_2$ from the terminal 21c over to the terminal 21b, thereby interrupting the electric current to the motor M.

Further, in preparation for an event where the film take-up operation stops because of an unexpected malfunction, etc. before completion of the film advancement for one frame, the control circuit A performs its control operation in association with the switch $S_1$ so as to change the contact 21a of the switch $S_2$ from the terminal 21c over to the terminal 21b when the contact 14a of the switch $S_1$ has changed from the terminal 14b over to the terminal 14c.

The driving device and its related control circuit in FIGS. 1 to 4 are shown in a state of prior to the loading of film, wherein the sprocket shaft 3 is at a lowered position by the action of the spring 6, and the pin 5 is engaged with the notched groove 4 to enable the sprocket shaft 3 and the sprocket 4 to rotate together. The change-over lever 16 causes the contact 14a to be in contact with the terminal 14b by the engaging part 11b of the detection lever 11 which is under the biasing force of the spring 12. The contact 21a is in contact with the terminal 21b.

In this state, when a leading portion of the film F is held on the take-up spool 15 and then the shutter button is depressed, the shutter is released. Upon termination of the shutter release, the exposure completion signal output is produced, and the control circuit A changes the contact piece 21a from the terminal 21b over to the terminal 21c. As the result of this, the motor M starts its forward rotation, and the drive gear 7, i.e., the sprocket 4, rotates through a film take-up system to advance the film F, and the take-up spool 15 gradually receives the film F thereon.

Figure 6:
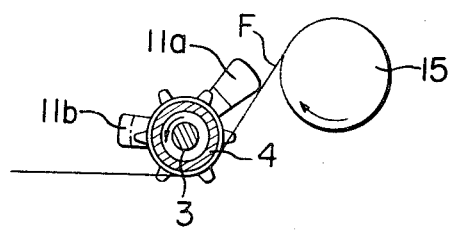

At this instant, the film between the sprocket 4 and the take-up spool 15 is in a tensioned state, which pushes the detecting part 11a of the detection lever 11 to cause it to rotate counterclockwise to the position of FIG. 6. With this rotational shifting of the detection lever 11, the engaging part 11b thereof rotates counterclockwise from its position in FIG. 3. However, since the detection lever 16 is hindered in its rotation by engagement with the sprocket shaft 3, the switch S1 still remains in the film take-up mode, wherein the contact 14a is in contact with the terminal 14b.

While the shutter button is held depressed, the contact 21a of the switch $S_1$ changes from the terminal 21c over to the terminal 21b at the completion of the film take-up, whereby the motor M stops its rotation and the shutter is released. Upon completion of the exposure operation due to termination of the shutter release, the exposure completion signal output is produced, and the control circuit A changes the contact 21a of the switch $S_2$ over to the terminal 21c to cause the motor M to rotate forwardly to resume the film take-up operation.

As soon as the shutter button is freed from its depressed state, the motor M stops in a state of the film having been advanced, at which instant the contact piece 21a changes over to the side of the terminal 21b.

In the following, the film rewinding operation will be explained.

Figure 5:
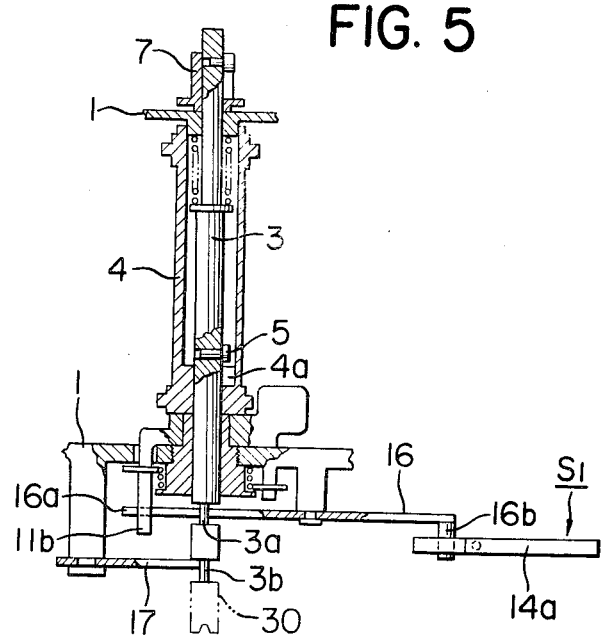
FIGS. 5, 6 and 7 are views corresponding, respectively, to FIGS. 1, 2 and 3 that are useful for explaining the rewinding operation by the driving device.
Figure 7:
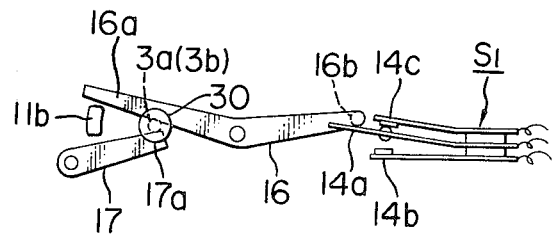

A rewinding button 30 is pushed upward from its position shown in FIG. 1 to raise the sprocket shaft 3 as shown in FIG. 5, thereby disengaging the pin 5 from the notched groove 4 to render the sprocket 4 rotatable relative to the sprocket shaft 3. By this raising of the sprocket shaft 3, the holding lever 17 is rotated counterclockwise to cause its engaging part 17a to fit into the outer groove 3b as shown in FIG. 7, thereby preventing the sprocket shaft 3 from lowering. At the same time, the change-over lever 16 also rotates to cause its engaging part 16a to fit into the outer groove 3a. By the rotation of the change-over lever 16, the contact 14a separates from the terminal 14b and now contacts the terminal 14c, whereby the switch $S_1$ changes from its film take-up mode over to the film rewinding mode. When the film has been advanced, or taken up on the spool, in its entire length, and no further film can be drawn out of a film magazine, the film take-up completion signal is not emitted, and the switch $S_2$ remains in a state, wherein the contact piece 21a is in contact with the terminal 21c. However, when the switch $S_1$ is changed over by the rewinding button 30, a change-over signal is transmitted to the control circuit A simultaneously with this change-over of the switch $S_1$. In this way, when the contact piece 14a changes over to the terminal 14c and the contact piece 21a to the terminal 21b, the motor M rotates in the reverse direction to cause disconnection of the motor from the take-up system, and, instead, the motor is linked with another take-up system (not shown) to drive a film magazine (not shown) to rewind the film F.

At the final stage of the film rewinding, when the leading portion of the film comes out of the film take-up spool 15, the film detection lever 11 rotates by the action of the spring 12 to be brought to a state as shown in FIG. 2. In other words, the engaging part 16a and the pin 16b of the lever 16 displace from their state shown in FIG. 7 to that shown in FIG. 3. As the result of this, the contact piece 14a changes over to the terminal 14b to assume the film take-up mode, although the motor M does not starts its forward rotation and remains stopped, unless the shutter button is depressed.

After rewinding of the exposed film, when a fresh magazine containing unexposed film is loaded, its leading portion is held on the film take-up spool 15, and then the shutter button is depressed, the shutter travels as mentioned in the foregoing so that exposure completion signal is transmitted to the control circuit A and the motor M starts its forward rotation.

With rotation of the sprocket shaft 3, the holding lever 17 rotates clockwise from its state shown in FIG. 7 by a well-known means to assume a state shown in FIG. 3, whereby the engaging part 17a withdraws from the outer groove 3b. Accordingly, the sprocket shaft 3 and the rewinding button 30 are pushed down by the bias force of the spring 6, and the pin 5 fits into the notched groove 4a to engage the sprocket shaft 3 with the sprocket 4.

At the initial stage of the film take-up operation immediately after loading of a fresh roll of film into the camera, both sprocket shaft 3 and the rewinding button 30 are at their raised position as in FIG. 5, and the change-over lever 16 is in a state of enabling the switch $S_1$ to be changed over to the film rewinding mode by displacement of the detection lever 11. Therefore, when the film F causes the detection lever 11 to displace, the possibility of initial film take-up is inhibited. To avoid this, the present invention selects the magnitude of the biasing force of the spring 12 as follows. At the outset of the film take-up operation after completion of rewinding the exposed film, since the sprocket 4 does not restrain the film before the sprocket 4 rotates with the sprocket shaft 3, i.e., before the sprocket starts film forwarding, the tensile force in the film F between the sprocket 4 and the film take-up spool 15 is weak. At this instant, the biasing force of the spring 12 is so selected that the detection lever 11 may not be displaced to the state shown in FIG. 6.

Figure 8:
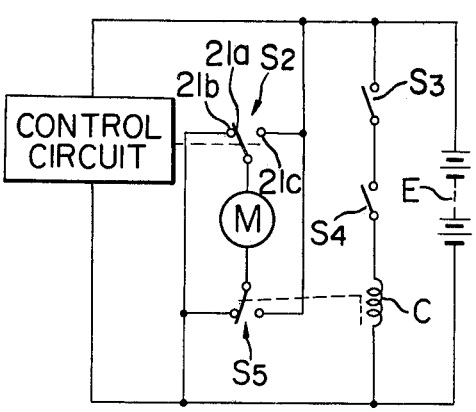
FIGS. 8, 9 and 10 are modifications of the mode selection circuit.
Figure 9:
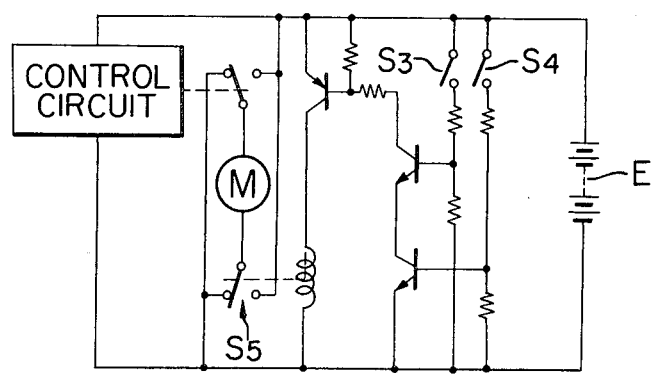
Figure 10:
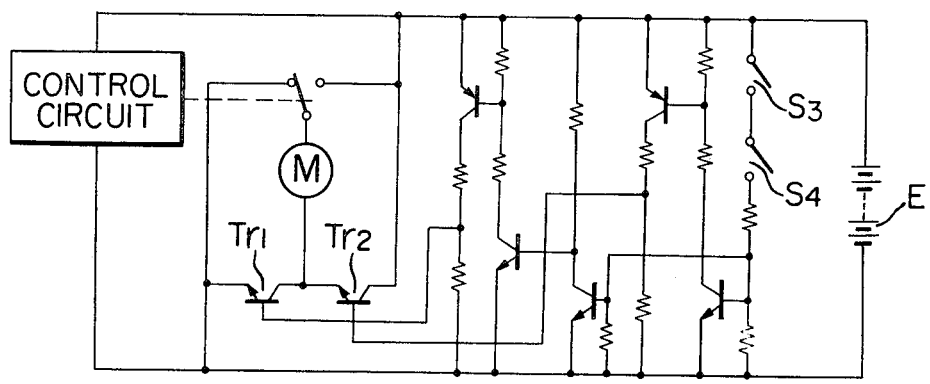

FIGS. 8 to 10 illustrate modified embodiments of the mode selection circuit for the electric driving device according to the present invention.

The embodiment shown in FIG. 8 is characterized in that, in addition to the above-mentioned switch $S_2$ comprising the contact 21a and the terminals 21b, 21c, it has a switch $S_3$ interlocked with the rewinding button 30 and closed upon the button depression; a switch $S_4$ interlocked with the detection lever 11 and closed during the film detecting state of the detection lever; a coil C, through which electric current flows during closure of both switches $S_3$, $S_4$; and a relay switch $S_5$ associated with the coil C.

When the switch $S_3$ is closed by operating the rewinding button, and, if the switch $S_4$ is also closed at that time, the relay switch $S_5$ is changed over. Simultaneously, an ON signal from the relay switch $S_5$ is transmitted to the control circuit A, whereupon the contact 21a of the switch $S_2$ changes over to the side of the terminal 21b, and the motor M rotates in the reverse direction.

After completion of the film rewinding, when the switch $S_4$ is opened by the action of the detection lever 11, the relay switch $S_5$ changes over to the film take-up mode. Thereafter, when the shutter button is depressed and the film take-up operation commences, the switch $S_3$ is opened in association with the film take-up operation.

Incidentally, the switches $S_3$, $S_4$ may be provided in parallel as shown in FIG. 9. Further, the relay switch $S_5$ may be replaced by for two transistors Tr1, Tr2 as shown in FIG. 10.

I claim:

1. An apparatus for controlling film advancement in a camera of the type that has driving means, including an electrical motor, for driving a take-up spool to wind film thereon from a supply spool for film take-up and for alternatively driving the supply spool to rewind film, and which has change-over switch means having a first state for supplying current in one direction to the electrical motor to drive the motor in a forward direction for film take-up and having a second state for supplying current in the opposite direction to the electrical motor to drive the motor in a reverse direction for film rewind, the apparatus comprising:
   a displacement member for controlling the state of the change-over switch means, the displacement member having a first position at which it disposes the change-over switch means in the first state and having a second position at which the change-over switch means is in the second state;
   means for controlling the position of the displacement member, the controlling means including first and second members, each having first and second operating positions, and first and second biasing means for respectively biasing the first and second members to the first operating position, the first and second members being operable to hold the displacement member in its first position upon at least one of the first and second members being in the first operating position and being operable to permit movement of the displacement member to its secomd position only upon both the first and second members being in the second operating position, the first member being disposed in the second operating position when film is wound upon the take-up spool, and the second member being disposed in the second operating position in response to the initiation of film rewind; and
   means operable upon initiation of film rewind for releasably holding the second member in the second operating position until initiation of subsequent film take-up.

2. The apparatus of claim 1, wherein the controlling means further comprises means for urging the displacement member to the second position, the urging means comprising a movable resilient contact of the change-over switch means that is engaged by the displacement member.

3. The apparatus of claim 2, wherein the first biasing means for biasing the first member to the first operating position has a force selected to overcome the force of the urging means urging the displacement member to the second position.

4. The apparatus of claim 1, wherein the first member is held in the second operating position by film tension.

5. The apparatus of claim 1, wherein the displacement member and the first member are pivoted for rotation about substantially parallel axes, and wherein the second member is movable in the direction of said parallel axes.

6. The apparatus of claim 5, wherein the second member comprises an axially movable shaft having a circumferential groove therein that is adapted to receive the displacement member when the second member is in the second operating position to allow the displacement member to rotate from the first position.

7. The apparatus of claim 6, wherein the shaft has another circumferential groove therein, and wherein the means for releasably holding the second member in the second operating position comprises a member biased to enter said other groove when the shaft moves to the second operating position.

8. The apparatus of claim 7, wherein said member biased to enter said other groove is coupled to the driving means and is moved out of said other groove upon initiation of film take-up.

* * * * *